UNITED STATES PATENT OFFICE.

RUPERT GREVILLE-WILLIAMS, OF ALBANY, NEW YORK, ASSIGNOR TO THE ALBANY COAL TAR DYE AND CHEMICAL COMPANY, OF SAME PLACE.

PROCESS OF MAKING DYES.

SPECIFICATION forming part of Letters Patent No. 412,149, dated October 1, 1889.

Application filed June 6, 1889. Serial No. 313,387. (No specimens.)

*To all whom it may concern:*

Be it known that I, RUPERT GREVILLE-WILLIAMS, a subject of Her Majesty the Queen of Great Britain, and residing at the city of Albany, in the county of Albany and State of New York, have invented certain new and useful Improvements in Processes for the Production of Coloring-Matter; and I do hereby declare that the following is a full, clear, and exact description of the invention, which will enable others skilled in the art to which it appertains to make and use the same.

My invention relates to the production of new coloring-matters, which dye unmordanted cotton in an alkaline or soap bath, and which coloring-matters are obtained by first combining one molecule of a tetrazo compound with one molecule of one of the herein-mentioned phenols or amines, and then combining this intermediate product with one molecule of the alkalized acids of the orchilla lichens or compounds of the same. The alkalized acids referred to can be prepared by treating the orchilla lichens for a short time with water in the presence of lime, and after filtering precipitating the orsellinic and other acids by means of hydrochloric acid. The acids of the lichens thus obtained in the form of a jelly are filtered off and dried at a low temperature. They are then boiled with various alcohols to produce the corresponding alkalized derivatives. The alkalized acids may be as well prepared by treating the lichens directly with the alcohols.

I do not bind myself to these or any other methods for producing the alkalized lichen acids, as my invention does not relate to their production but to the colors produced by their use.

By tetrazo compounds I mean tetrazo-diphenyl and its homologues, tetrazo-naphthalene, tetrazo-stilbene, tetrazo-fluorene, tetrazodiphenyl ether, tetrazo-azo benzole and its homologues, tetrazo-oxydiphenyl, as well as the alkalized compounds or the sulpho or carbo acids of the same.

The phenols and amines I have successfully used up to the present time in this process are the sulpho-acids of the naphthylamines, the naphthols, monoethylaniline, diphenylmine, salicylic acid.

The following examples will be sufficient to show how I practically carry out my invention.

*Example No. 1.*—30.2 pounds of tolidine sulphate or its equivalent of the base are converted into the tetrazo compound in the usual manner. This solution is then run into twenty-eight pounds of alpha-naphthylamine, monosulpho-acid soda salt, and thirty pounds of acetate of soda dissolved in one hundred gallons of water. The mixture is well stirred, and when all the tetrazo compounds are combined this intermediate product is run into a solution of 18.2 pounds of the methylated lichen acid and one hundred pounds of caustic soda. The color thus formed is treated as usual. It is a blue shade of red and has the following formula:

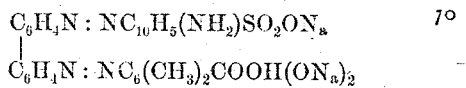

*Example No. 2.*—The twenty-eight pounds of naphthylamine sulpho-acid in Example No. 1 can be replaced by 13.8 pounds of salicylic acid. In this case an alkali must be used in the place of the acetate of soda. The shade thus produced is a yellower shade of red.

Now, having described my invention, what I claim is—

The process for the production of mixed coloring-matters by first combining one molecule of tetrazo-diphenyl or one molecule of one of the other herein-mentioned tetrazo compounds with one molecule of one of the herein-mentioned amines or phenols and then combining this intermediate product with one molecule of an alkalized acid of the orchilla lichen or halogen or sulpho compound of the same, substantially as set forth.

In witness whereof I have hereunto set my hand this 3d day of June, 1889.

RUPERT GREVILLE-WILLIAMS.

Witnesses:
HOWARD S. NEIMAN,
R. A. SHAW.

Corrections in Letters Patent No. 412,149.

It is hereby certified that in Letters Patent No. 412,149, granted October 1, 1889, upon the application of Rupert Greville-Williams, of Albany, New York, for an improvement in "Process of Making Dyes," the word "alkalized" wherever it appears throughout the printed specification and claim should read *alkylized;* and that the said Letters Patent should be read with these corrections therein that the same may conform to the record of the case in the Patent Office.

Signed, countersigned, and sealed this 22d day of October, A. D. 1889.

[SEAL.]

CYRUS BUSSEY,
*Assistant Secretary of the Interior.*

Countersigned:
 C. E. MITCHELL,
  *Commissioner of Patents.*